US009612855B2

(12) United States Patent
Gilbert et al.

(10) Patent No.: US 9,612,855 B2
(45) Date of Patent: Apr. 4, 2017

(54) VIRTUAL MACHINE MIGRATION BASED ON THE CONSENT BY THE SECOND VIRTUAL MACHINE RUNNING OF THE TARGET HOST

(75) Inventors: David Gilbert, Manchester (GB); David Haikney, Manchester (GB); David Mackintosh, Manchester (GB)

(73) Assignee: International Business Machines Corporation, Armonk, NY (US)

( * ) Notice: Subject to any disclaimer, the term of this patent is extended or adjusted under 35 U.S.C. 154(b) by 1043 days.

(21) Appl. No.: 13/347,374

(22) Filed: Jan. 10, 2012

(65) Prior Publication Data

US 2012/0192181 A1    Jul. 26, 2012

(51) Int. Cl.
*G06F 9/455* (2006.01)
*G06F 9/48* (2006.01)
*G06F 9/50* (2006.01)

(52) U.S. Cl.
CPC ........ *G06F 9/45558* (2013.01); *G06F 9/4856* (2013.01); *G06F 9/45533* (2013.01); *G06F 9/5088* (2013.01); *G06F 2009/4557* (2013.01)

(58) Field of Classification Search
None
See application file for complete search history.

(56) References Cited

U.S. PATENT DOCUMENTS

| 8,095,929 | B1* | 1/2012 | Ji et al. ............................ 718/1 |
| 8,175,863 | B1* | 5/2012 | Ostermeyer ........ G06F 17/5009 703/13 |
| 8,489,744 | B2* | 7/2013 | Elyashev et al. ............. 709/226 |
| 2007/0266383 | A1* | 11/2007 | White .................... G06F 9/4856 718/1 |
| 2009/0154709 | A1* | 6/2009 | Ellison .................... H04L 9/083 380/282 |
| 2009/0249366 | A1* | 10/2009 | Sen ........................ G06F 9/5077 719/327 |
| 2011/0099548 | A1* | 4/2011 | Shen et al. ........................ 718/1 |
| 2011/0202640 | A1* | 8/2011 | Pillutla .......................... 709/221 |

OTHER PUBLICATIONS

Kiswani et al, VMFlock: Virtual Machine Co-Migration for the Cloud, 2011, ACM, HPDC'11, pp. 159-170.*
International Business Machines Corporation (IBM), "Virtual machine migration by respecting the security policies", Technical Disclosure Bulletin, IP.com—Prior Art Database, Dec. 4, 2008 (IPCOM000177039D).

* cited by examiner

*Primary Examiner* — Abu Ghaffari
(74) *Attorney, Agent, or Firm* — Brian F. Russell; Steven L. Bennett

(57) ABSTRACT

A system, method, and computer program product for controlling migration of a VM operable on a first site and a second site. The system includes an identify component for identifying the second site; a request component for sending a consent request message to a software component, wherein the consent request message comprises at least one of an identifier of the VM and an identifier of the second site; a calculate component, operable on the software component and responsive to receiving the consent request message, for determining consent for the second site; a send component, responsive to a positive determination, for sending a consent message; and a migrate component, responsive to receiving the consent message, for migrating the VM from the first site to the second site.

15 Claims, 9 Drawing Sheets

500

| NAME | CPUS | MEMORY | LOCATION | VM # | VM NAME | VM_OWNER |
|---|---|---|---|---|---|---|
| PS1 | 4 | 16 GB | LOC_1 | 2 | VM1 | "ABC" |
|  |  |  |  |  | VM2 | - |
| PS2 | 4 | 24GB | LOC_2 | 0 | - | - |
| PS3 | 4 | 8GB | LOC_1 | 1 | VM3 | "XYZ" |
| PS4 | 1 | 8GB | LOC_1 | 0 | - | - |

| NAME | RULES | RESULT |
|---|---|---|
| PS1 | N/A | - |
| PS2 | RULE_1, RULE_4 | REJECT |
| PS3 | RULE_1 | 100 |
| PS4 | RULE_1 RULE_2 | 50 |

| VM | RULE # | APPLIES | EFFECT |
|---|---|---|---|
| VM1 | RULE_1 | FOR ALL | SCORE = 100 |
|  | RULE_2 | CPUS < 4 | HALVE SCORE |
|  | RULE_3 | TEMP. > 50 C | HALVE SCORE |
|  | RULE_4 | LOC NOT LOC_1 | REJECT |
|  | RULE_5 | TARGET REJECTS | REJECT |
|  | RULE_6 | SOURCE VM REJECTS | REJECT |
|  | RULE_7 | OTHER VM REJECTS | REJECT |

*FIGURE 5*

| VM | RULE # | APPLIES | EFFECT |
|---|---|---|---|
|  | RULE_1 | FOR ALL | SCORE = 100 |
|  | RULE_2 | CPUS < 4 | HALVE SCORE |
| VM1 | RULE_3 | TEMP. > 50 C | HALVE SCORE |
|  | RULE_4 | LOC NOT LOC_1 | REJECT |
|  | RULE_10 | FOR ANY VM: VM_OWNER = "JKL" | REJECT |

*FIGURE 8*

VIRTUAL MACHINE MIGRATION BASED ON THE CONSENT BY THE SECOND VIRTUAL MACHINE RUNNING OF THE TARGET HOST

FIELD OF THE INVENTION

The present invention relates in general to computer virtual machines. In particular, the present invention relates to an apparatus, method, and computer program product for managing virtual machine migration.

BACKGROUND OF THE INVENTION

A virtual machine (VM) is a software implementation of a physical computer. Computer programs designed to execute on the physical machine execute in a similar way when executed on a VM. In some cases, a VM provides a complete system platform to support a full operating system (OS). A physical machine can be shared between users using different VMs, each running a different OS.

Modern processor architectures have enabled virtualization techniques that allow multiple operating systems and VMs to run on a single physical machine. These techniques use a hypervisor layer that runs directly on the physical hardware and mediates accesses to physical hardware by providing a virtual hardware layer to the operating systems running in each virtual machine. The hypervisor can operate on the physical machine in conjunction with a "native VM." Alternatively, the hypervisor can operate within an operating system running on the physical machine, in conjunction with a "hosted VM" operating at a higher software level. A given hypervisor will exist to service many VMs on a single system. An example of a hypervisor is IBM® Power Series® hypervisor (PHYP).

Examples of VM technology are:
IBM® Power Series logical partitions (LPARs).
Linux® Kernel-Based Virtual Machine (KVM), which allows one or more Linux® or Microsoft® Windows® virtual machines to be run on top of an underlying Linux® that runs KVM.
Xen, which allows a guest (virtualized) Linux® to be run on top of Linux®.
Parallels, which allows Linux® and Windows® on top of Mac OS X.
VMWare which allows Linux® and Windows® systems on top of Mac OS X, Windows® and Linux® systems. IBM and Power Series are trademarks of International Business Machines Corporation. Linux is a registered trademark of Linus Torvalds. Microsoft and Windows are trademarks of Microsoft Corporation.

In a distributed or "cloud" environment it is possible for VMs to "migrate" between physical systems to facilitate, for example, load balancing and maintenance. Various mechanisms presently allow this to happen in a manner that is transparent to the VM. In certain cases this is undesirable—an example being when the owner of the cloud is not the owner of the VM and so does not have authority to perform migrations. Such situations are common in cloud environments, where VM owners allow a separate cloud provider to host their machine. The VM owner may place restrictions on the VM's ability to migrate around the cloud as part of the service agreement—for example, the VM may not leave the country due to export regulations. Certain hosts may be unsuitable targets for the migration of a VM (e.g., security issues), but implementing control of the system using this information from a central position is unmanageably complex.

The migration restrictions upon each VM in the cloud are tracked from a managing component, and may in fact be too complex, arbitrary or dynamic to calculate outside of the VM itself. In addition, there may be a requirement to migrate a VM from one server to a server of a server pool that satisfies the most criteria.

"Virtual machine migration by respecting the security policies", Kumar, P, http://priorartdatabase.com/IPCOM/000177039 (Electronic Publication: Dec. 4, 2008) proposes that security policies for any VM be made available as a bit array policy string included as part of the VM description file. A decision can then be made on a VM migration on whether the VM security policy is met. A static VM description file comprises a bit mask of network security policies required for any hosting system. A VM may not be migrated to a host unless the host provides those features. Hosting systems may be configured to allow modification of their network security policies to accommodate the requirements of incoming migrated VMs. However, migration rules are often far too complex to be computed ahead of time and thus be made static. Further, bit-mask implementation of network protocols and ports to represent such complex rules is difficult.

SUMMARY OF THE INVENTION

Viewed from a first aspect, the present invention provides a system for controlling migration of a first virtual machine (VM) in a data processing system, wherein the data processing system includes the first VM operable on a first site and a second site. The system includes an identify component for identifying the second site, a request component for sending a consent request message to a software component. The consent request message includes at least one of an identifier of the first VM and an identifier of the second site, a calculate component, which is operable on the software component and responsive to receiving the consent request message, for determining consent for the second site, a send component responsive to a positive determination for sending a consent message, and a migrate component responsive to receiving the consent message for migrating the first VM from the first site to the second site.

The present invention provides a system, wherein the software component is the first virtual machine, a hypervisor, and/or a second virtual machine operable at the second site. The hypervisor is operable at either the first or the second site.

The present invention provides a system, wherein the first site includes a first server and the second site includes a second server. The present invention provides a system, wherein the identify component includes a rules engine operable for applying rules for identifying the second site.

The present invention provides a system, wherein the consent includes an outcome of a further rules engine, and wherein the calculate component is operable within an operating system of the first software component.

The present invention provides a system, wherein the send component is further operable for sending a consent message comprising a migration requirement of the first software component; and the migrate component, responsive to the second site satisfying the migration requirement, for migrating the first VM from the first site to the second site.

The present invention provides a system, wherein the migration requirement includes a well-defined data format, and wherein the consent request message includes a well-defined data format. The present invention provides a system, wherein the request component is further operable for sending the consent request message to the software component directly.

The present invention provides a system, wherein the first software component is one of the first virtual machine and a second virtual machine operable at the second site, and wherein the system includes the request component further operable for sending the consent request message to a hypervisor, that responsive to receiving the consent request message, sends the consent message to the first software component.

The present invention provides a system, including an identify component further operable for identifying a plurality of the second sites, a request component further operable for sending the consent request message to the software component, wherein the consent request message includes at least one of an identifier of the first VM and an identifier of each of the plurality of second sites, a calculate component further operable on the software component, responsive to receiving the consent request message, for determining one of the plurality of second sites to give consent to, and a migrate component, responsive to receiving the consent message, for migrating the first VM from the first site to the determined second site.

Viewed from a second aspect, the present invention provides a method for controlling migration of a first virtual machine (VM) in a data processing system. The data processing system includes the first VM operable on a first site, and a second site. The method further includes identifying the second site and sending a consent request message to a software component, wherein the consent request message includes at least one of an identifier of the first VM and an identifier of the second site. In response to receiving the consent request message, consent for the second site is determined. In response to a positive determination, a consent message is set. In response to receiving the consent message, the first VM migrates from the first site to the second site.

Viewed from a second aspect, the present invention provides a method for controlling migration of a first virtual machine (VM) in a data processing system. The data processing system includes the first VM operable on a first site and a second site. The method further includes identifying the second site and sending a consent request message to a software component, wherein the consent request message includes at least one of an identifier of the first VM and an identifier of the second site. In response to receiving the consent request message, consent for the second site is determined. In response to a positive determination, a consent message is sent. In response to receiving the consent message, the first VM migrates from the first site to the second site.

Viewed from a second aspect, the present invention provides a method for controlling migration of a first virtual machine (VM) in a data processing system. The data processing system includes the first VM operable on a first site and a second site. The method further includes identifying the second site and sending a consent request message to a software component, wherein the consent request message includes at least one of an identifier of the first VM and an identifier of the second site. In response to receiving the consent request message, consent for the second site is determined. In response to a positive determination, a consent message is sent. In response to receiving the consent message, the first VM migrates from the first site to the second site.

The present invention provides a method, wherein the step of sending a consent request message to a software component includes a step of sending the consent request message to the first virtual machine, to a hypervisor, and/or to a second virtual machine operable at the second site.

The present invention provides a method, wherein the first site includes a first server and the second site includes a second server. The present invention provides a method, wherein the step of identifying includes a step of applying rules for identifying the second site. The present invention provides a method, wherein the step of determining consent comprise determining an outcome of a further rules engine.

The present invention provides a method, wherein the method further includes steps of sending a consent message comprising a migration requirement of the first software component; and in response to satisfying the migration requirement, a step of migrating the first VM from the first site to the second site.

The present invention provides a method in which the step of sending a consent message comprising a migration requirement includes a step of sending a consent message comprising a well-defined data format, and a step of sending a consent request message comprising a well-defined data format.

The present invention provides a method, wherein the method further includes the step of sending the consent request message to the software component directly.

The present invention provides a method, wherein the step of sending a consent request message to a software component includes a step of sending the consent request message to one of the first virtual machine and a second virtual machine operable at the second site, and wherein the method further includes the steps of sending the consent request message to a hypervisor, and in response to receiving the consent request message, sending the consent message to the first software component.

The present invention provides a method, wherein the method further includes the steps of: identifying a plurality of the second sites; sending the consent request message to the software component, wherein the consent request message includes at least one of an identifier of the first VM and an identifier of each of the plurality of second sites; in response to receiving the consent request message, a step of determining one of the plurality of second sites to give consent to; and in response to receiving the consent message, a step of migrating the first VM from the first site to the determined second site.

Viewed from a further aspect, the present invention provides a computer program product for controlling migration of a first virtual machine (VM) in a data processing system, the computer program product comprising: a computer readable storage medium readable by a processing circuit and storing instructions for execution by the processing circuit for performing a method for performing the steps of the invention.

Viewed from a further aspect, the present invention provides a computer program stored on a computer readable medium and loadable into the internal memory of a digital computer, comprising software code portions, when said program is run on a computer, for performing the steps of the invention.

Embodiments of the present invention provide a mechanism and framework by which a live VM will provide consent to migration in a dynamic manner, thus absolving the managing entities from maintaining such information for each hosted VM.

Embodiments of the present invention provide a dynamic or run-time query of a VM to obtain explicit consent for a migration to proceed. Such dynamic consent avoids the disadvantages of setting up complex rules in bit-masks that in simple cases, have been used for implicit consent.

Embodiments also provide mechanisms for configurable implicit consent, which are extensible and are capable of arbitrary XML parsing, as well as being able to simply compare network security policies. In addition, a number of migration preference score can be calculated, rather than only a binary allow (yes) or deny (no) for a specific target server. Preference scores allow a control program to choose the best target server, rather than simply one that is not rejected.

Embodiments provide different methods to request consent from the VM at, or prior to, the point of migration. In one method, a control program directly communicates with the VM via a network interface, for example, the CIM channel of IBM® Director. In this case the control program (also known as an orchestrator) will simply not initiate the migration if the VM does not provide consent. In another method, source/destination hypervisors use a virtual interrupt like event to communicate with the VM. In this case the hypervisors will refuse to perform the technical process of migration if consent is not given. This failure will then be reported back to the control program.

Regardless of which communication method is chosen, the migration strategy and the consensual requirements may be sought and granted in several methods, each suited to different scenarios. For example, the VM can be asked for migration requirements prior to any migrations. The requirements must be in a standard format that the control program and/or hypervisor must then store and interpret themselves. The determination and interpretation of migration requirements prior to the performance of any migrations is useful when a control program intends to migrate multiple VMs and must calculate a valid final site for all VMs before any are moved. Such a calculation is easiest when the control program understands all the requirements itself. Also for example, the source VM can be given a list of one or more possible migration target sites and asked to select the most favorable, or to indicate if none are acceptable. This is useful if a VM has requirements that are too complex to calculate externally. It also provides the ability for the VM to keep sensitive requirements hidden internally. Combinations can be also used together, for example, the control program may use one method to calculate a proposed migration strategy for multiple VMs, and another method verify that the solution is valid.

Embodiments allow for consent to be also provided from other VMs, which are already present on the destination system. For example, a VM may require that no VM belonging to a competitor is hosted on the same system. In this case it would not provide consent for such a VM to join the system, even if said VM gave consent. The requirements themselves may be soft (preferences) or hard (mandatory), a VM is never allowed to migrate in a way that violates hard requirements. Migration that violates soft requirements may be dealt with in various ways, for example, the VM owner may be entitled to a small concession from the cloud provider.

In a distributed virtualized environment (or cloud), certain hosts may be unsuitable targets for the migration of a VM (for various reasons, including security issues), but implementing control of the system using this information from a central position is unmanageably complex. The present invention provides a system and method whereby a target host seeks explicit consent from the VM that is to be migrated before accepting the migrated VM. This system/method may be implemented in the control program, in which case, the control program does not initiate migration if consent is not granted. Alternatively, it may be implemented in the source or target hypervisor, in which case, the hypervisor does not perform the migration if consent is not granted.

BRIEF DESCRIPTION OF THE DRAWINGS

Aspects of the invention itself will best be understood by reference to the following detailed description of illustrative embodiments when read in conjunction with the accompanying drawings, where:

FIG. 5 is a block diagram depicting exemplary tables depicting information used in the exemplary method of FIG. 3, in accordance with an embodiment of the present invention;

FIG. 8 is a block diagram depicting a further exemplary table depicting information used in the exemplary method of FIG. 3, in accordance with an embodiment of the present invention.

DETAILED DESCRIPTION OF THE EMBODIMENTS

Figure 1:
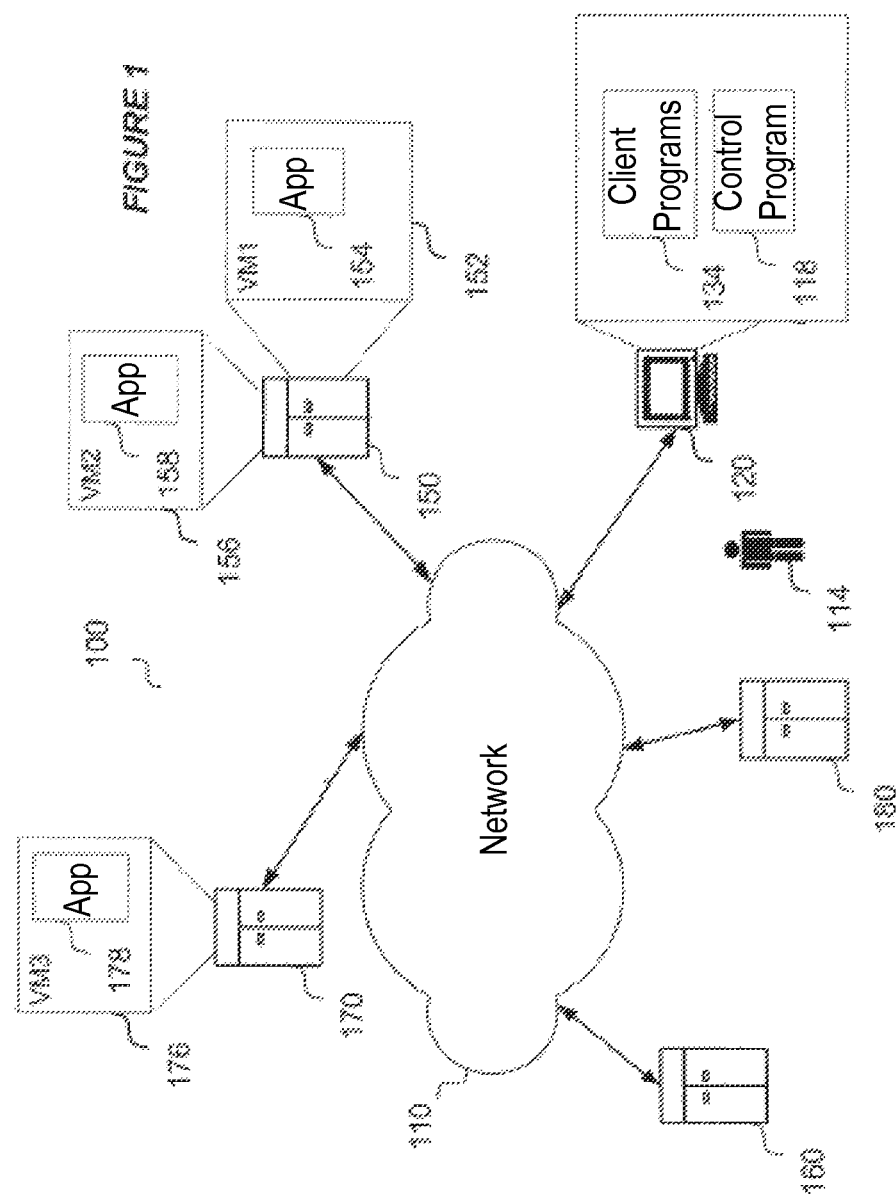
FIG. 1 is a high-level block diagram depicting an exemplary data processing system in which an embodiment of the present invention may be implemented.

FIG. 1 is a block diagram depicting a data processing system 100 in which an embodiment of the present invention may be implemented. The data processing system 100 includes workstation 120 and servers 150, 160, 170 and 180. Workstation 120 and servers 150, 160, 170 and 180, which each include at least one processor coupled to data storage storing program code executable by the processor, are connectable through a network 110.

Server 150 includes virtual machines (VMs) VM1 152 and VM2 156 that are running different operating systems. Server 170 includes virtual machine VM3 176. Applications 154, 158 and 178 are operable on VMs 152, 156, 176, respectively. The user/administrator 114 accesses applications 154, 158 and 178 by interacting with application client programs 134 on workstation 120. Administrator 114 controls data processing system 100 through a control program 118 (also known as an orchestrator) operable on the workstation 120. An example of control program 118 is IBM® Director.

When VM1 152 or VM2 156 is migrated from a source server 150 to a target server 160, 170 or 180, control program 118 initiates the migration. Migration usually proceeds with control program 118 identifying a VM (e.g., VM1 152 or VM2 156) to migrate from a hypervisor on the source server 150 (i.e., the source hypervisor). Control program 118 selects the target server 160, 170 or 180 to which the VM is migrated. The source and target hypervisors are connected, so that they can manage the technical process of migration themselves.

Figure 2:
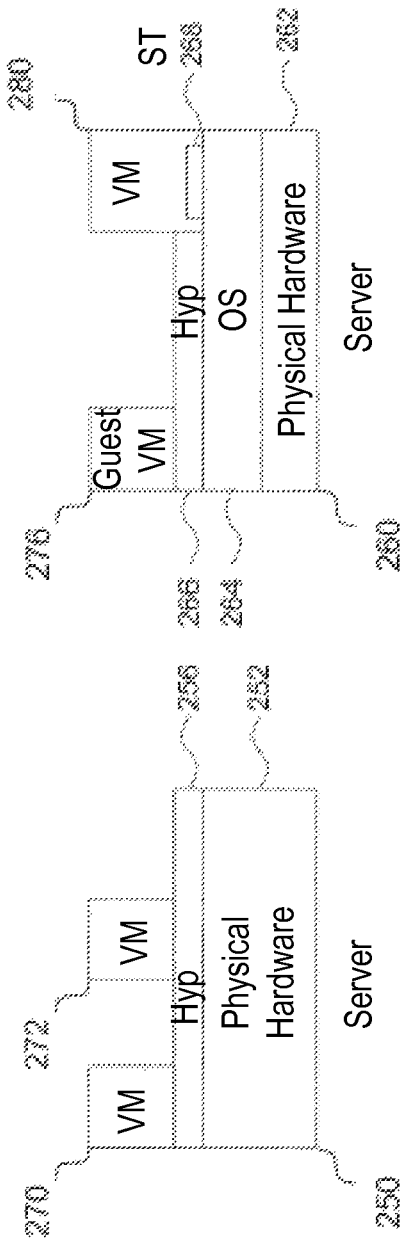
FIG. 2 is a high-level block diagram depicting two exemplary physical servers in which an embodiment of the present invention may be implemented.

FIG. 2 is a block diagram depicting the two servers 250 and 260 in which a preferred embodiment of the present invention may be implemented. A hypervisor 256 is operable on the physical hardware 252 of physical server 250 and allows native VMs 270, 272 to run on top of it. VMs 270, 272 are each isolated from each other and are operable as if they are running on an entire real (i.e., physical) system. The hypervisor 256 emulates hardware for each VM 270 and 272 such that when VMs 270, 272 access their virtualized hardware devices (for example, an Ethernet card or Small Computer System Interface (SCSI) controller), hypervisor 256 intercepts these instructions and converts them to accesses to server 250.

An operating system (OS) 264 is operable on the physical hardware 262 of physical server 260. A hypervisor 266 is operable on the OS 264. Guest VM 276 is operable on the hypervisor 266. VM 280 is also operable on the OS 264.

A System Translator (ST) 268 is a software component that allows a whole system (OS 264 and applications 154, 158 and 178) that was designed for one Instruction Set Architecture (ISA), for example, Sun SPARC, to run on a different Industry Standard Architecture (ISA) system (for example IBM® POWER6®). (IBM and POWER6 are trademarks of International Business Machines Corporation.) ST 268 sits as a layer between VM 280 and the physical hardware 262.

As depicted in FIG. 2, ST 268 is operable within an operating system (not shown) in VM 280. In this case, OS 264 and a userspace program are started to provide the system translation functionality. ST 268 provides a similar service for single VM 280, as hypervisor 256, 266 provides for multiple VMs 270, 272 running on physical server 250, 260. ST 268 emulates hardware in the same way as hypervisor 256, 266 except that ST 268 emulates for hardware of a different architecture. In addition, ST 268 translates instructions that VM 280 wishes to execute. System translators, typically, use dynamic binary translation to convert machine instructions from one ISA to another. Hardware emulation is also used so that the entire machine is emulated and entire system images can run unaltered.

In an alternative embodiment, ST 268 is operable as part of hypervisor 266. In an alternative embodiment the ST 268 is operable directly on hypervisor 266. In this embodiment, ST 268 acts like an OS that runs in VM 270, 272, 276, and 280. In alternative embodiments: ST 268 is operable within native OS 264, as a layer above native OS 264; or between VM 270, 272, 276, 280 and physical hardware 252, 262.

Functions of ST 268 in normal operations comprise translating instructions and emulating hardware. Translating instructions uses dynamic binary translation to execute the instructions required by VM 280 on a different physical architecture. Emulation of hardware provides a mechanism by which hardware that the translated OS expects to be present is emulated. Such hardware includes, for example, network cards, memory controllers, interrupt controllers, read only memories (ROMs), and random access memory (RAM).

Figure 3:
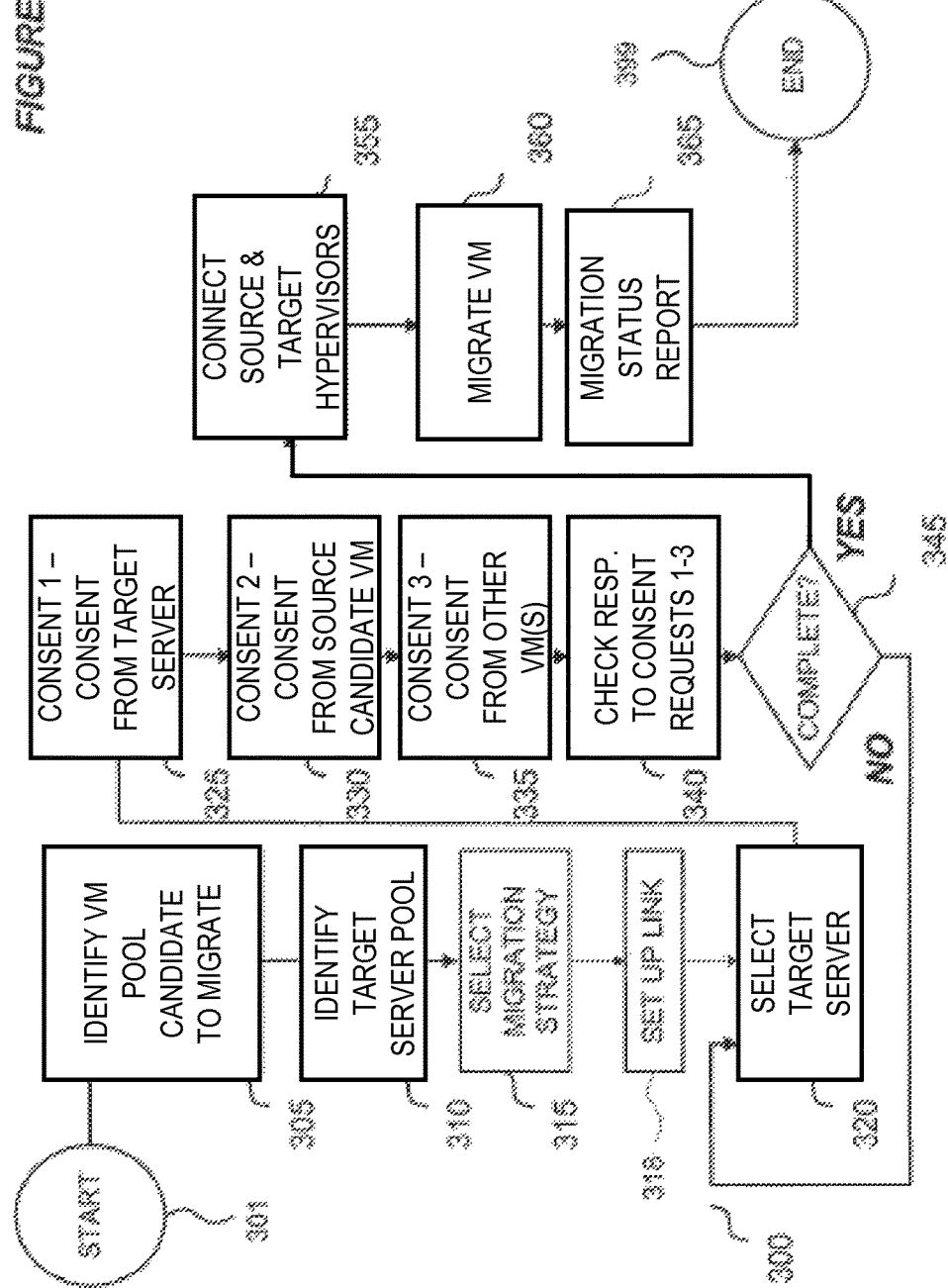
FIG. 3 is a high-level exemplary schematic flow diagram depicting exemplary operation method steps of controlling VM migration, in accordance with an embodiment of the present invention.
Figure 4:
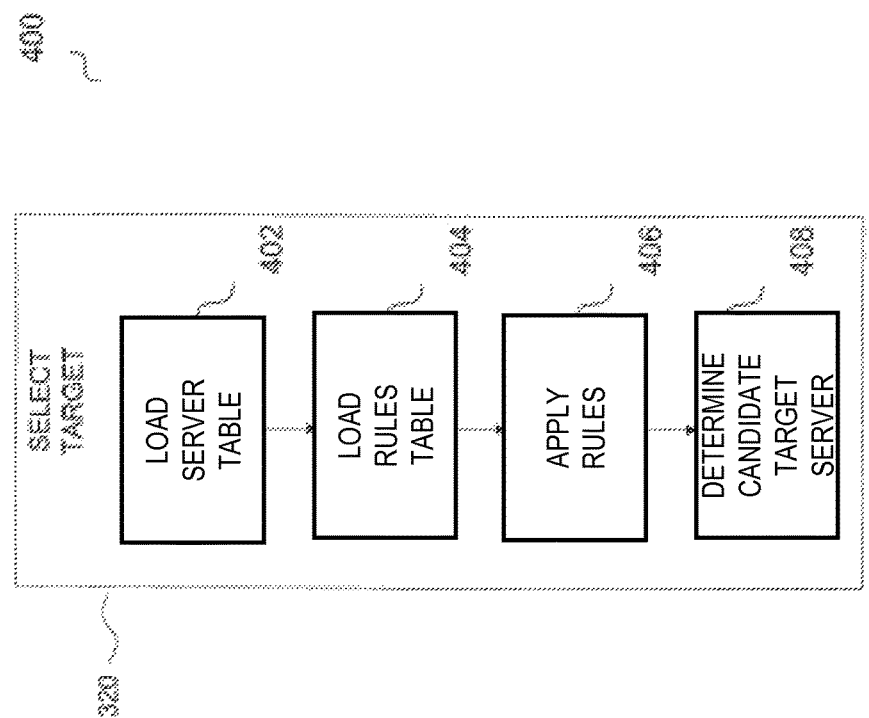
FIG. 4 is a high-level exemplary schematic flow diagram depicting exemplary operation method steps of selecting a target server, in accordance with an embodiment of the present invention.

FIG. 3, which should be read in conjunction with FIGS. 4-9, depicts a high-level exemplary schematic flow diagram 300 depicting operation method steps for controlling VM migration in accordance with a preferred embodiment of the present invention. FIG. 4 is a high-level exemplary schematic flow diagram 400 depicting operation method steps for selecting a target server among servers 160, 170 and 180 (FIG. 1) in accordance with a preferred embodiment of the present invention. FIG. 5 is a block diagram 500 depicting exemplary tables 501, 521 and 531 depicting information used in the method of FIG. 3 in accordance with a preferred embodiment of the present invention.

Figure 6:
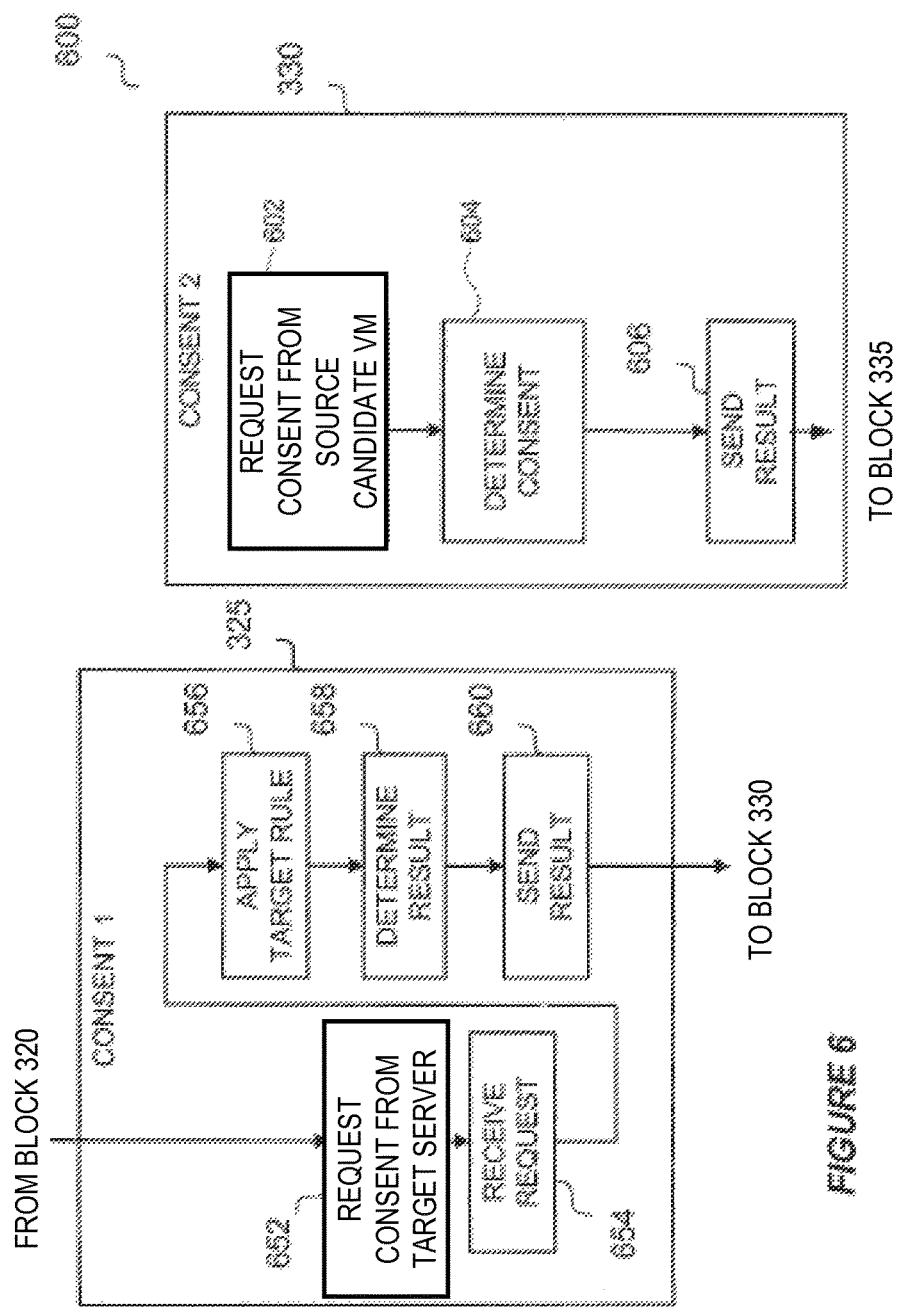
FIG. 6 are high-level exemplary schematic flow diagrams depicting further detail of the exemplary operation method steps of FIG. 3, of controlling VM migration, in accordance with an embodiment of the present invention.
Figure 7:
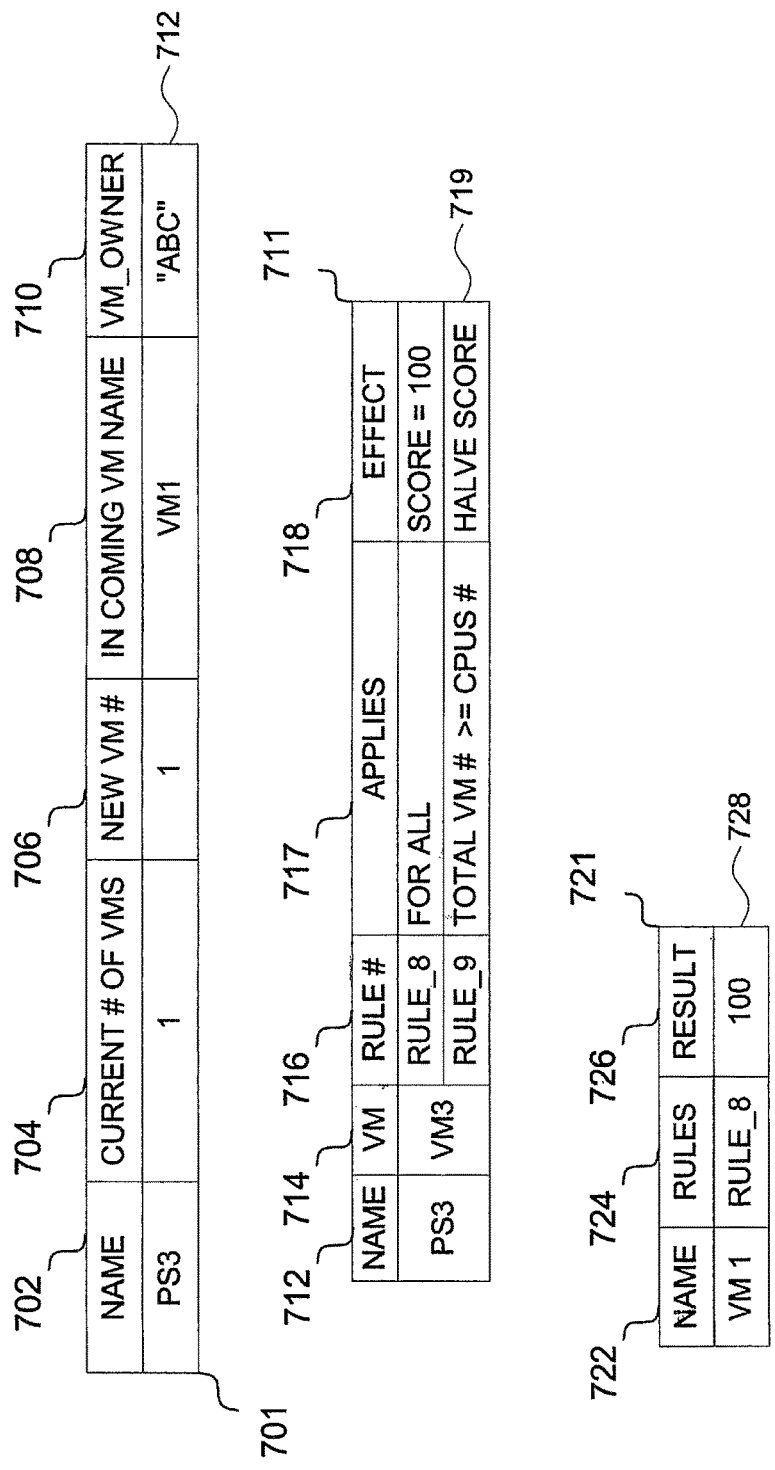
FIG. 7 is a block diagram depicting further exemplary tables depicting information used in the exemplary method of FIG. 3, in accordance with an embodiment of the present invention.
Figure 9:
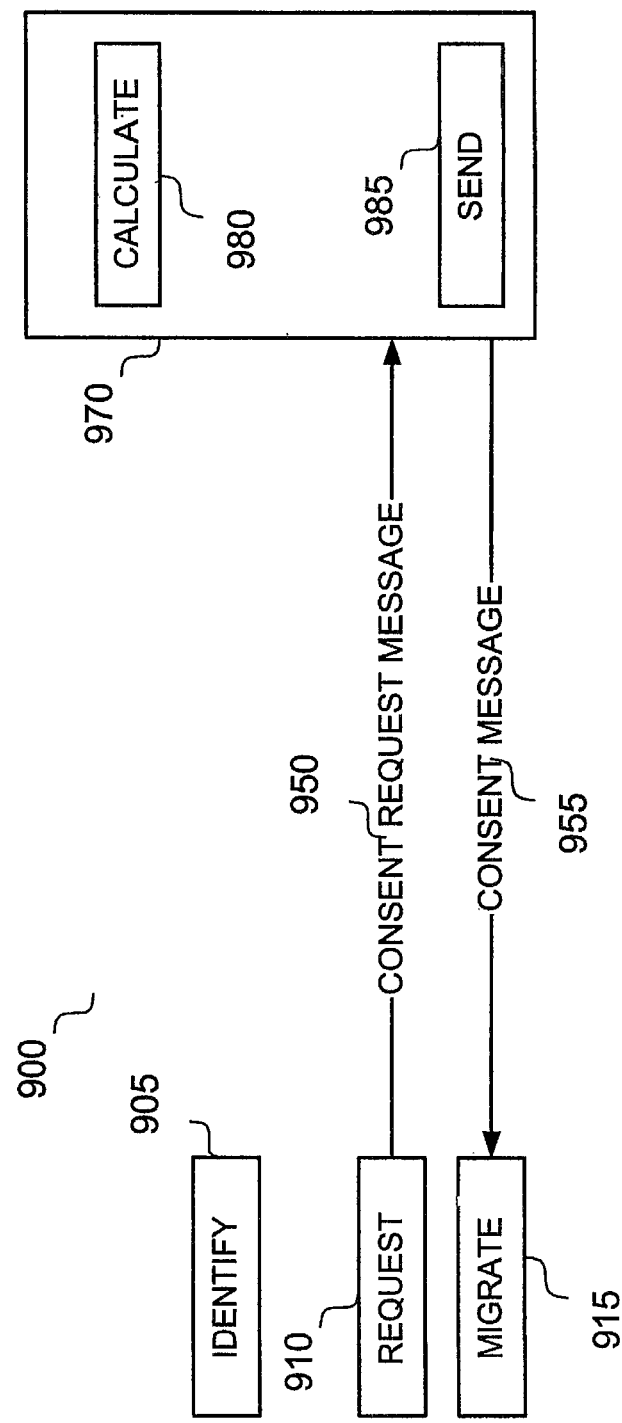
FIG. 9 is a high-level block diagram depicting components used in the system for controlling migration of a virtual machine, in accordance with an embodiment of the present invention.

FIG. 6 depicts high-level exemplary schematic flow diagrams 600 depicting further detail of the operation method steps of FIG. 3 for controlling VM migration, in accordance with a preferred embodiment of the present invention. FIG. 7 shows a block diagram 700 depicting further exemplary tables 701, 711 and 721 depicting information used in the method of FIG. 3 in accordance with a preferred embodiment of the present invention. FIG. 8 shows a block diagram depicting a further exemplary table 801 depicting information used in the method of FIG. 3 in accordance with a preferred embodiment of the present invention. FIG. 9 is a block diagram 900 depicting components used in the system for controlling migration of a virtual machine, in accordance with a preferred embodiment of the present invention. The block diagram 900 depicts a software component 970, in which a calculate component 980 and a send component 985 are operable. Software component 970 is operable within, for example, VM 152, 156, 176, or hypervisor 256, 266.

To illustrate the present invention, a VM 152, 156, 176 migration example depicted in FIGS. 1 and 2 will be used. The skilled person will appreciate that the present invention is equally applicable to other migration scenarios. In the depicted exemplary migration scenario, administrator 114 wishes to migrate VM1 152 from source server 150 to target server 170 because maintenance is required on source server 150. As part of the service level agreement (SLA) between the owner of the data processing system 100 and the owner of VM1 152, VM1 152 may not be migrated without consent. In a preferred embodiment, consent is provided by VM1 152, which communicates migration consent to relevant entities, such as control program 118, source hypervisor 256, and target hypervisor 266.

Referring now to FIG. 3, the method starts at step 301 and proceeds to step 305. At step 305, control program 118 identifies a pool of candidate VMs 152, 156, 176 to migrate. In the example, the pool includes only one VM1 152 on source server 150 at a first site. At step 310, control program 118 identifies a pool of target servers 160, 170, 180 at a second site that VM1 152 could be migrated to. In the example, source server 150 is excluded from being also a target server, but in an alternative embodiment, source server 150 could also be a target server. This could be useful if being migrated from guest VM 276 to VM 280. In the preferred embodiment, VM1 152 is on a first site, which is source server 150, and is to be migrated to a second site, which is target server 170. In an alternative embodiment, VM1 152 is migrated to a second site, which is also at target server 150, that is the same server 150 as source server 150.

At step 315, the control program 118 selects a migration strategy. The migration strategy includes explicit consent from source VM1 152, target server 170, and a further VM3 176 that is on target server 170.

In an alternative embodiment, the migration strategy does not require consent from all of components 152, 170, 176.

At step 318, a link is set up from control program 118 to VMs 152, 176. In a preferred embodiment, control program 118 directly communicates with VMs 152, 176 via a network interface, for example a Common Information Model (CIM) as provided by IBM Director. In this case, control program 118 will simply not initiate the migration if either of VM1 152 or VM3 176 does not provide consent.

In an alternative embodiment, hypervisors 256, 266 of source server 150 and target server 170, respectively, use a virtual interrupt-like event to communicate with VM1 152 and VM3 176. In this case, hypervisors 256, 266 will refuse to perform the technical process of migration if consent is not given. Failure to obtain consent will then be reported back to control program 118.

At step 320, an identify component 905 (FIG. 9) of control program 118 selects a candidate target server 170. Referring to FIG. 4, which provides a more detailed depiction of the selection process of block 320, at step 402 identify component 905 loads server table 501 from memory. FIG. 5 depicts an example of exemplary server table 501 depicting information used in a data processing system 100. Server table 501 depicts relationships between servers 150, 160, 170 and 180 and related information. Server table 501 includes a plurality of columns 502, 504, 506, 508, 510, 512 and 514. "NAME" column 502 includes an identification name of the servers 150, 160, 170 and 180. For example, information concerning server 150 is depicted in table row 516. "CPUS" column 504 includes the number of CPUs in each of servers 150, 160, 170 and 180. The "MEMORY" column 506 includes the amount of memory in each of servers 150, 160, 170 and 180. "LOCATION" column 508 includes the location of each of servers 150, 160, 170 and 180. The "VM#" column includes the number of VMs 152, 156, 176 in each of servers 150, 160, 170 and 180. "VM NAME" column 512 includes the name(s) of the VM(s) on each of servers 150, 160, 170 and 180. The "VM_OWNER" column 514 includes the owner of each of servers 150, 160, 170 and 180. Table row 516 illustrates that server 150 with name "PS1" includes 4 CPUs, 16 GB memory, is located at "LOC_1", has two VMs (VM1 152 and VM2 156) and is owned by "ABC".

In a preferred embodiment, server table 501 includes a well-defined data format. In this context a "well-defined" data format refers to an extensible description data format for providing relevant details for possible migration destinations. Such a format is understood by VMs 152, 156 and 176, control programs 118 and hypervisors 256 and 266. In a preferred embodiment a machine-readable format such as Extensible Markup Language (XML) is used.

Continuing with FIG. 4, at step 404, identify component 905 loads a rule table 521 (FIG. 5) for each VM 152, 156, 176 from memory. FIG. 5 depicts an example of an exemplary rule table 521 for one of the VMs, namely, VM1 152. Rule table 521 depicts a set of rules used by control program 118. Rule table 521 includes a plurality of columns 522, 524, 526 and 528. "VM" column 522 includes an identification for VMs 152, 156 and 176. "RULE #" column 524 includes an identification of the rule. "APPLIES" column 526 includes conditions when the corresponding rule is applied. "EFFECT" column 528 includes the effect on a SCORE. Information concerning one rule "RULE #"="RULE_2" is depicted in table row 529. For example, table row 529 illustrates that "RULE_2" is a rule that is applied when the number of CPUs on the corresponding server 170 is less than 4.

Continuing with FIG. 4, at step 406 identify component 905 applies the rules to each of the possible servers 150, 160, 170 and 180. The application of rules results in a rule result table 531 (FIG. 5) for each of servers 150, 160, 170 and 180. FIG. 5 depicts an example of an exemplary rule result table 531. Rule result table 531 depicts a set of results used by control program 118. Rule result table 531 includes a plurality of columns 532, 534 and 536. "NAME" column 532 includes an identification for one of servers 150, 160, 170 and 180. "RULES" column 534 lists the rules that were applied. "RESULT" column 534 lists a determined result. Information concerning one rule "RULE #"="RULE_1" is depicted in table row 538. Table row 538 illustrates that for server "PS3" a result of "SCORE=100" was determined after the application of rule "RULE_1". If control program 118 does not understand each of the rules, it chooses to ignore that rule. For example, control program 118 may not understand the temperature rule, "RULE_3". In an alternative embodiment, all rules need to be applied.

"RULE_1" is a starting point rule starting with a score of 100. "RULE_2" is applicable if the number of CPUs are under 4, and results in a halving of the score. "RULE_3" is applicable if the temperature is measured at greater than 50° C., and if applicable, results in a halving of the score. "RULE_4" is applicable if a proposed target server 160, 170, 180 is not in location "LOC_1", and results in rejection of that proposed target server 160, 170, 180. Such a rule would be appropriate if the owner of the migrating VM will not countenance migration to an unsupported location. "RULE_5", "RULE_6", "RULE_7", apply if the target server 170, source VM 152 or other VM 176, respectively, does not provide consent to a migration and results in rejection of the migration.

Referring back to FIG. 4, at step 408 identify component 905 determines candidate target server 170 from rule result table 531. Target server 170 is determined because the control program 118 determines that server 170 has the highest result of 100.

In a preferred embodiment, consent can be sought at the time of migration (i.e., in real-time). In an alternative embodiment, consent can be sought ahead of time (i.e., pre-registered). Pre-registered consent may be the case for implicit consent, where the VM 152, 156 or 176 to be migrated has provided a set of requirements to the control program 118 or hypervisor 256, 266. Pre-registered consent may also be used with explicit consent, for example, if a VM 152, 156, 176 grants advance permission to migrate to a given target server 160, 170, 180, that permission may be considered valid as long as the particular details of the target server 160, 170, 180 do not change over time.

Referring back to the general flow diagram of FIG. 3, at step 325 control program 118 seeks consent for the migration from target server 170. In this regard, FIG. 6 depicts additional detail regarding step block 325. At step 652 of FIG. 6, a request component 910 of control program 118 sends a first consent request message 950 (FIG. 9) to target server 170. First consent request message 950 includes information about candidate source VM 152 and target server 170.

At step 654, a software component on target server 170 receives and processes first consent request message 950.

Calculate component 980 of target server 170 populates server VM table 701 (FIG. 7) with the information from consent request message 950. FIG. 7 depicts an example of an exemplary server VM table 701 for server 170. Server VM table 701 depicts relationships between target server 170 and the related information about candidate source VM 152. Table 701 includes a plurality of columns 702, 704, 706, 708 and 710. "NAME" column 702 includes an identification name of target server 170. For example, information concerning server 170 is depicted in table row 712. "CURRENT # OF VMS" column 704 includes the number of VMs 152, 156, 176 on target server 170. "NEW VM #" column 706 includes the number of candidate source VMs that are planned to be migrated. "INCOMING VM NAME" column 708 includes the name of the candidate incoming VM 152. "VM_OWNER" column 710 includes the owner of candidate incoming VM 152. Table row 712 illustrates: server 170 already holds one VM, namely, VM3 178; there is one candidate incoming VM 152, called "VM1" owned by "ABC". In a preferred embodiment, the software component on target server 170 is operable within hypervisor 256, 266 of target server 170. In an alternative embodiment, the software component on target server 170 is operable within another software component on target server 170, for example, within the OS.

Each server 150, 160, 170, 180 also maintains a VM rule table 711. FIG. 7 depicts an exemplary VM rule table 711 for target server 170. VM rule table 711 depicts a set of rules used by target server 170. VM rule table 711 includes a plurality of columns 713, 714, 716, 717, 718. "NAME" column 713 includes the name of the target server 170. "VM" column 714 includes an identification for the VM 176 on target server 170. "RULE #" column 716 includes an identification of the rule. "APPLIES" column 717 includes conditions when the corresponding rule is applied. "EFFECT" column 718 includes the effect on a SCORE. For example, information concerning one rule "RULE #"="RULE_9" is depicted in table row 719. Table row 719 illustrates that: "RULE_9" is a rule that is applied when the total number of VMs on target server 170 is more than the number of CPUs on the server 170; and the result of the rule is that the input SCORE is halved. Target server 170 can define separate rules for each VM 176 that it hosts or can apply the same set of rules for each VM 176 that it hosts.

Continuing with the flow diagram of FIG. 6, at step 656, calculate component 980 of target server 170 applies a VM rule from VM rule table 711 for the candidate incoming VM "VM1" 152, using the appropriate information from server VM table 701. At step 658, a result is determined and saved in a VM rule result table 721.

Each server 150, 160, 170, 180 maintains VM rule result table 721 for itself. FIG. 7 depicts an example of exemplary VM rule result table 721. VM rule result table 721 depicts a set of results used by server 170 and subsequently, control program 118. VM rule result table 721 includes a plurality of columns 722, 724, 726. "NAME" column 722 includes an identification for VM1 152, for which the results has been calculated. "RULES" column 724 includes which rules were applied. "RESULT" column 726 includes a determined result. Information concerning one rule "RULE #"="RULE_8" is depicted in table row 728. Table row 728 illustrates that for server "PS3" (i.e., target server 170) a result of "SCORE=100" was determined after the application of rule "RULE_8". It should be noted that "RULE_9" does not apply in this exemplary scenario (shown in FIG. 7) because the total number of VMs is not greater than the number of CPUs. Therefore, only "RULE_8" applies, resulting in a result of "100". Referring back to FIG. 6, at step 660, a send component 985 of target server 170 sends a first consent message 955 back to control program 118. This concludes the detailed description of step block 325 of FIG. 6.

Returning now to step 325 of FIG. 3, the process continues to step 330, which depicts request component 910 seeking consent for the migration from the candidate source VM, namely, VM1 152. The candidate source VM is given a list of one or more possible migration targets and asked to indicate if the target is acceptable, since there are circumstances when a VM has requirements that are too complex to calculate externally. Moreover, this framework allows the candidate source VM to keep sensitive requirements hidden internally.

Referring to a more detailed description of step block 330 in FIG. 6, at step 602 request component 910 requests consent from the candidate source VM (i.e., VM1" 152) by sending a second consent request message 950 directly to VM1 152, 176 via the network interface. The description of target server 170 is provided to the virtual memory space of VM1 152. The operating system of VM1 152 receives the second consent request and, in turn, requests consent from a user-space daemon (i.e., calculate component 980 of VM1 152). Calculate component 980 of the VM1 152 has an internal set of rules for scoring destinations which is slightly different from those used by control program 118 at step 320.

From step 602, the process continues to step 604, which depicts calculate component 980 of the source candidate VM (i.e., VM1 152) determining consent using private rule table 801 that each VM 152, 156, 176 maintains for itself. FIG. 8 depicts an exemplary private rule table 801 for VM1 152, which includes a set of private rules used by VM1 152. In addition to sharing rules in common with rule table 521, private rule table 801 includes a private rule depicted in table row 809. For example, "RULE_10" is applicable if the owner of VM 176 at the target server 170 is owned by "JKL". In the example, a "REJECT" message is not sent to control program 118 because target server 170 is not owned by "JKL". For example, this rule permits the owner of VM1 152, which is "ABC" (from server table 501), to reject a move to target server 170, if the target server 170 hosts a VM 152, 156, 176 from a different owner "JKL", for security purposes.

In an alternative embodiment, the candidate source VM (e.g., VM1 152) selects the most favorable destination target server 170 from a pool of possible destination target servers including servers 160, 170 and 180. In practice, where multiple destinations are suitable, the VM may "score" each destination's suitability, for example, on a scale of 0 (rejected) to 100 (ideal).

From step 604, the process continues to step 606, which depicts send component 985 of the source candidate VM (e.g., VM1 152) sending a second consent message 955 to control program 118. This concludes the detailed description of step block 330 of FIG. 6.

Returning now to step 330 of FIG. 3, the process continues to step 335. Since target server 170 is already hosting VM3 176, consent must be sought from VM3 176 to allow VM1 152 to be migrated. At step 335, control program 118 therefore seeks consent from any VMs that are already present on target server 170. Request component 910 requests consent from the existing VM3 176 by sending a third consent request message 950 directly to VMs 152, 176 via the network interface. The third consent request message 950 includes information about the incoming VM1 152, including a description of the current state of the machine. For example, VM3 176 may require that no VM belonging to a competitor is hosted on the same server 150, 160, 170 or 180. Calculate component 980 of existing VM3 176 determines consent using private rule table 801 that VM3 176 maintains for itself. VM3 176 may not provide consent for VM1 152 to join the system, even if VM1 152 gave consent. VM3 176 follows similar steps 602, 604, 606 as in step 330 to assess consent, but with its own set of rules (not shown). A send component 985 of the source candidate VM1 152 sends a second consent message 955 to the control program 118.

At step 340, having received positive consent messages from steps 325, 330 and 335, control program 118 reassesses whether the migration of VM1 152 to target server 170 is still appropriate. Control program 118 achieves the reassessment by repeating steps 402, 404, 406 and 408 of step 320. In the reassessment additional rules may apply. For example "RULE_6" of rule table 521 will apply if source VM1 152 has sent consent message 955 comprising "REJECT".

At decision step 345, if the reassessment results in a need to select a different combination of source candidate VM and target server from that assessed previously, control is returned to step 320 to identify a new candidate combination of source VM and target server. Control program 118 then selects at step 320 the next most nearly optimal destination server 180 ("PS4" in this example, because a score of 50 had been calculated for that server 180). As part of the service level agreement (SLA) between the system owners and the VM owners, and the hosting charges could be tied to the migration score.

However, if the reassessment at decision block 345 results in the same selected combination, control passes to step 355. Control program 118 has determined an optimal combination of source VM and target server (e.g., VM1 152 and server 170) based on the applied rules. At step 355, a migrate component 915 (FIG. 9) of control program 118 instructs hypervisors 256, 266 of the source server 150 and target server 170 to communicate with each other. At step 360, the hypervisors 256, 266 of the source server 150 and target server 170 effect the migration of VM1 152. At step 365, a status of the migration is determined and reported to control program 118. The method ends at step 399. In a preferred embodiment, the rules that apply in each circumstance are applied sequentially. For example, if RULE_1 and RULE_2 apply, then RULE_1 is applied first, then the result of RULE_1 is applied as an input to RULE_2. The skilled person will appreciate that a number of different rules, and algorithms for applying rules, could be used.

In an alternative embodiment the pool includes more than one VM 152, 156, 176. The system and method determines an optimal VM 152, 156, 176 to migrate by calculating scores for each of the candidate VMs 152, 156, 176.

In an alternative embodiment, the migration strategy includes implicit consent by control program 118 and/or hypervisors 256, 266 gathering migration requirements from the components prior to migration, and then applying them at the time of migration. Control program 118 sends a consent request message to any VM 152, 156, 176 that is being considered for migration. VM 152, 156, 176 is asked for migration requirements prior to any migrations. The requirements are in a standard format that control program 118 and/or hypervisor 256, 266 then store and interpret themselves. This pre-registration is applicable, for example, in circumstances when control program 118 intends to migrate multiple VMs 152, 156, 176 and must calculate a valid final site for all VMs 152, 156, 176 before any are moved. Such a calculation is less onerous when control program 118 understands all the requirements itself. In an alternative embodiment, requirements include a well-defined and extensible data format, understood by VMs 152, 156, 176, control program 118 and hypervisors 256, 266. Requirements may be hard (i.e., mandatory) or soft (i.e., preferred), which provide a set of rules for creating the same destination scoring.

In an alternative embodiment, control program 118, or components of control program 118 are operable within hypervisor 256, 266 of one of servers 150, 160, 170, 180 involved in the method.

In alternative embodiments, consent steps 330 and 335 are performed after source and target hypervisors 256, 266, respectively, have been instructed to execute the migration. A consent daemon informs the operating system of candidate source VM1 152 of the score. In turn, the operating system informs hypervisors 256, 266, which then refuse to execute the migration, informing the control program 118 of the failure, for example.

In an alternative embodiment, extensions are provided to the rule system to aid usability. Each rule is associated with a string of human-readable text to explain the purpose of the rule. For each rule that is applied, the associated text is appended to a log that a human may read to understand the score given to a particular destination/VM. For example, such a log could be presented to control program 118 whenever a migration fails, enabling a human to more easily determine the cause of failure.

In an alternative embodiment, default actions are applied for each rule. The default action would be executed whenever a rule is not understood. Critical rules that must always be satisfied, even when not understood, would be given a default action of rejection.

In a preferred embodiment, the present invention provides a system and method for VM 152, 156, 176 to communicate migration consent to relevant entities, for example, control program 118 and relevant hypervisors 256, 266. In an alternative embodiment, control program 118 seeks consent via direct communication to VM 152, 156, 176 via a network socket, for example. If consent is not given, control program 118 simply does not attempt the migration. In an alternative embodiment, hypervisors 256, 266 seek consent via communication to VM 152 by using, for example, hypervisor calls and virtual interrupts. If consent is not given, hypervisor 256, 266 refuses to perform the migration, and then may notify control program 118 accordingly.

In an alternative embodiment of step 602 of FIG. 6, request component 910 requests consent from candidate VM1 152 by sending second consent request message 950 to source server 170. Source server 170 communicates to VM1 152 through hypervisor 256, 266. Hypervisor 256, 266 communicates directly to VM1 152 to request consent for migration to target server 170 by presenting a virtual interrupt to VM1 152, which indicates that real-time migration consent is needed.

In a preferred embodiment, the present invention provides a system and method for explicit consent. For example, VM 152, 156, 176 is presented with a list of possible target servers 160, 170, 180 and selects the most favorable or rejects them all. In practice, where multiple destinations are suitable, VM 152 may score the suitability of each of proposed target servers 160, 170 and 180, for example, on a scale of 0 (rejected) to 100 (ideal).

Alternatively or additionally, one or more consent may be implicit. For example, one or more of VM 152, 156 and 176 may provide a set of migration requirements to hypervisor 256, 266 and/or control program 118, wherein consent is implicitly granted for any target server 160, 170, 180 that satisfies the specified requirements.

In an alternative embodiment, a well-defined and extensible data format is provided for providing relevant details for possible migration target servers 160, 170, 180 for either explicit or implicit consent. Such a format is understood by VMs 152, 156, 176, control program 118 and hypervisors 256, 266. While a simple description format is sufficient, a more machine-readable form, such as XML, could be used.

In a preferred embodiment, consent can be sought at time of migration (real-time). In an alternative embodiment, consent can be sought ahead of time (pre-registered). Pre-registration may be the employed for implicit consent or for explicit consent. For example, if a VM 152, 156, 176 consents to permission to migrate to a given target server 160, 170, 180, that permission may be considered valid as long as the particular details of the target server 160, 170, 180, do not change over time.

In a preferred embodiment, consent for arrivals is also sought from VMs 176 already present on the target server 170. The VM 176 on candidate target server 170 is given a list of possible source VMs, and may score them. In a preferred embodiment, internally, the OS 264 of VM1 152 may be the component to provide consent. Additionally, VM1 152 may choose to seek consent from individual processes executing within OS 264.

As will be appreciated by one skilled in the art, control program 118 components may be embodied as components distributed within data processing system 100, such as in control program 118 on workstation 120, in hypervisor 256, 266, or in VM 152, 156, 176.

In an alternative embodiment, consent request message 950 and/or consent message 955 includes more than one of the plurality of second sites.

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions stored in a computer-readable storage medium/device. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, aspects of the present invention may be embodied as a system, method, or computer program product. Accordingly, aspects of the present invention, including described "software component" aspects (for example the identify, request, calculate, send and migrate components), may take the form of an entirely hardware embodiment, a software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s)/device(s) having computer readable program code embodied thereon.

Any combination of one or more computer readable medium(s)/devices may be utilized. The computer readable storage medium/device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium/device would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

For the avoidance of doubt, the term "comprising", as used herein throughout the description and claims is not to be construed as meaning "consisting only of".

The invention claimed is:

1. A data processing system for controlling migration of a first virtual machine (VM), comprising:
    a processor;
    a data storage coupled to the processor; and
    program code within the data storage and executable by the processor to control migration of the first VM at a first site to a second site, wherein the program code includes:
        an identify component that identifies the second site;
        a request component that sends a consent request message to a plurality of software components including a second VM running at the second site, wherein the consent request message includes at least one of a set including an identifier of the first VM and an identifier of the second site; and
        a migrate component that, responsive to receiving consent messages indicating consent of the plurality of software components including the second VM to the migration, initiates migration of the first VM from the first site to the second site.

2. The data processing system of claim 1, wherein:
    the program code further includes the first VM; and
    the plurality of software components that receive the consent request message includes the first VM.

3. The data processing system of claim 1, wherein the plurality of software components includes a hypervisor.

4. The data processing system of claim 3, wherein the hypervisor is operable at the first site.

5. The data processing system of claim 3, wherein the hypervisor is operable at the second site.

6. The data processing system of claim 1, wherein the first site comprises a first server and the second site comprises a second server.

7. The data processing system of claim 1, wherein the identify component includes a rules engine operable to apply multiple rules for identifying the second site from among multiple candidate sites.

8. The data processing system of claim 1, wherein:
at least one consent message includes a migration requirement of one of the plurality of software components; and
the migrate component, responsive to the second site satisfying the migration requirement, migrates the first VM from the first site to the second site.

9. The data processing system of claim 1, wherein the request component is further operable to send the consent request message to at least one of the plurality of software components directly via a network interface.

10. The data processing system of claim 1, wherein:
the plurality of software components further includes the first VM and a hypervisor; and
the migrate component receives at least one consent message from the hypervisor via one of the first and second VMs.

11. The data processing system of claim 1, wherein consent of at least one of the plurality of software components to the migration is pre-registered with the migrate component prior to the request component sending the consent request message to the plurality of software components.

12. The data processing system of claim 1, wherein the first site and second site are two partitions of a same physical platform.

13. The data processing system of claim 1, wherein the identify component identifies the second site by reference to site-specific entries in an markup language data structure.

14. The data processing system of claim 1, wherein the identify component selects the second site utilizing one or more rules specifying one of more criteria from a set including: a number of central processing units (CPUs), site temperature, site physical location, and a number of virtual machines.

15. The data processing system of claim 1, wherein a least one of the plurality of software components determines consent to the migration utilizing one or more rules specifying one or more criteria from a set including: a number of virtual machines at the second site, a number of central processing units (CPUs) at the second site, and an owner of at least one virtual machine at the second site.

* * * * *